United States Patent Office 3,428,687
Patented Feb. 18, 1969

3,428,687
BIS(CHLORO-BROMOVINYL SULFOXIDES)
Paul C. Aichenegg, Prairie Village, Kans., and Carl D. Emerson, Kansas City, Mo., assignors to Chemagro Corporation, New York, N.Y., a corporation of New York
No Drawing. Original application Jan. 27, 1964, Ser. No. 340,504. Divided and this application June 21, 1965, Ser. No. 465,785
U.S. Cl. 260—607
Int. Cl. C07c *147/00;* A01n *9/14*
3 Claims

ABSTRACT OF THE DISCLOSURE

Compounds having the formulae

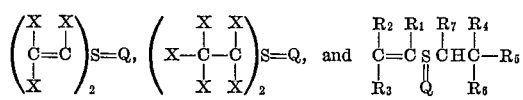

are prepared where at least two of the X groups are chlorine or bromine, two of $R_1$, $R_2$ and $R_3$ are chlorine or bromine and three of $R_4$, $R_5$, $R_6$ and $R_7$ are chlorine or bromine and the remaining X and R groups are hydrogen and Q is nothing or oxygen. The compounds are useful as nematocides and fungicides.

---

This application is a division of our application Ser. No. 340,504, filed Jan. 27, 1964.

This invention relates to new compounds, pesticidal uses of compounds and new processes of making compounds.

Compounds which have good pre-emergent herbicide activity normally are not satisfactory as nematocides since there remains the problem of growing crops after the killing of the nematodes.

It is an object of the present invention to prepare nematocides which are not good pre-emergent herbicides.

Another object is to prepare novel sulfides.

An additional object is to prepare novel unsaturated sulfoxides.

A further object is to prepare mixed saturated-unsaturated sulfoxides and sulfides.

Yet another object is to devise a novel method for preparing pure sulfides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the diverse means as set forth below.

It may be noted that it is not predictable which sulfides and sulfoxides will have good nematocidal and/or fungicidal activity. Thus, bis(1,2,2,2-tetrachloroethyl) sulfoxide is ineffective as a nematocide. Similarly, bis-(1,2,2,2-tetrachloroethyl) sulfide is completely ineffective as a nematocide and has poor fungicidal activity. Likewise, bis(1,2,2-trichlorovinyl) sulfide shows no nematocidal activity and poor fungicidal activity. These compounds are not included in the present invention. However, somewhat similar compounds structurally, but within the invention, have good nematocidal activity and, in some cases, also have found good fungicidal activity.

In one aspect of the invention there is prepared bis-(1,2,2-trichloroethyl) sulfide. This compound is a much better parasitic nematocide and fungicide than the corresponding bis(2,2,2-trichloroethyl) sulfide.

In another aspect of the invention there are prepared unsaturated sulfoxides of the formula

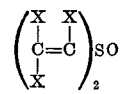

where at least two of the X's are halogen of atomic weight between 35 and 80, i.e., chlorine or bromine, and the other X is a halogen of atomic weight between 35 and 80 or is hydrogen. It has been found that the bis(2,2-dihalovinyl) sulfoxides are much poorer nematocides than either the bis(1,2-dihalovinyl) sulfoxides or the bis(1,2,2-trihalovinyl) sulfoxides. The bis(1,2,2-trihalovinyl) sulfoxides are poorer fungicides than the corresponding bis-(1,2-dihalovinyl) sulfoxides. Illustrative of such unsaturated sulfoxides are bis(1,2-dichlorovinyl) sulfoxide, bis-(2,2-dichlorovinyl) sulfoxide, bis(1,2,2-trichlorovinyl) sulfoxide, bis(1,2-dibromovinyl) sulfoxide.

It has been found that mixed trihaloethyl-dihalovinyl sulfides can be obtained by dehydrochlorination of bis-(trihaloethyl) sulfides in the presence of tertiary amines, e.g., trimethyl amine, triethyl amine, tripropyl amine, triisopropyl amine, tributyl amine, trioctyl amine, pyridine, dimethyl aniline, dipropyl butyl amine, tribenzyl amine. The mixed polyhaloethyl-polyhalovinyl sulfide is obtained even if twice as much tertiary amine is used as is theoretically required for the reaction. On the other hand, when other alkaline agents are employed, e.g., alkali metal ethoxides such as sodium methoxide, sodium ethoxide and potassium butoxide, to dehydrochlorinate bis(polyhaloethyl) sulfides there are obtained the expected bis(polyhalovinyl) sulfides. The polyhaloethyl polyhalovinyl sulfides and the bis(polyhalovinyl) sulfides can be converted to the corresponding sulfoxides by oxidation, e.g., with hydrogen peroxide or an organic peroxide. Examples of such sulfides and sulfoxides not previously mentioned are 1,2,2-trichloroethyl-1,2-dichlorovinyl sulfide, 1,2,2-trichloroethyl-1,2-dichlorovinyl sulfoxide, 1,2-dichlorovinyl sulfide, 1,2,2-tribromoethyl-1,2-dibromovinyl sulfide.

The unsaturated sulfoxides can also be formed by direct dehydrochlorination of the saturated sulfoxides, e.g., with sodium alkoxide such as sodium ethoxide.

It is difficult to prepare pure bis(polyhaloethyl) sulfides, e.g., bis(1,2,2-trichloroethyl) sulfide or bis(2,2,2-trichloroethyl) sulfide directly since the normal procedure for preparing such compounds, e.g., by reacting $SCl_2$ with dichloroethylene results in a crude sulfide-disulfide mixture that is difficult to separate. However, it has been found that if the crude mixture is oxidized to form the sulfoxide that the latter can be readily separated from the oxidation products of the disulfide. The sulfoxide in pure form can then be reduced, e.g., with $TiCl_3$ to form the pure bis(polyhaloethyl) sulfide.

Unless otherwise stated, all parts and percentages are by weight.

EXAMPLE 1

In 800 parts (8.0 moles) of symmetric cis dichloroethylene there were suspended 10 parts of anhydrous ferric chloride and 204 parts (2.0 mole) of sulfur dichloride were added at 30° to 35° C. over a period of 3.0 hours. The product was allowed to stand overnight and the ferric chloride removed by filtration. The material was washed with dilute aqueous hydrochloric acid and the organic layer dried and the solvent removed by stripping to give 383 parts of a crude mixture of bis(1,2,2-trichloroethyl) sulfide and disulfide. Upon distillation in a high vacuum there was obtained 60.8 parts (22.2% yield) of pure bis(1,2,2-trichloroethyl) sulfide as a yellow oil B.P.$_{0.03}$ 102° to 108° C., $n_D^{20}$ 1.5705.

This example was repeated several times using cis, trans or a mixture of cis and trans dichloroethylene and reaction times from 2.5 to 3.0 hours. Removal of ferric chloride was also obtained by treatment twice with 1 volume of acetone followed by dilution with 2 volumes of water followed by drying. The yields of crude mixtures ranged from 65 to 96% and the yield of pure bis(1,2,2-trichloroethyl) sulfide ranged from 22 to 28%. The pure compound is identified hereinafter as Compound 4975.

EXAMPLE 2

1 part of aluminum chloride was suspended in 50 parts (0.5 mole) of cis-dichloroethylene and 20 parts (0.1 mole) of 1,2,2-trichloroethyl sulfenyl chloride were added dropwise at 57° C. over a period of 15 minutes. Further heating of the mixture for 1 hour at 60° C. completed the reaction. The aluminum chloride catalyst was removed by treatment with 1 volume of acetone and then 2 volumes of water, the organic layer dried and then freed of solvent by vacuum stripping. 24.5 grams of crude addition product was obtained as a brown oil, $n_D^{25}$ 1.5770. Distillation in a high vacuum gave 15.7 parts (53% yield) of bis(1,2,2-trichloroethyl) sulfide as a yellow oil B.P.$_{0.01}$ 110° C., $n_D^{25}$ 1.5736 having the same basic infrared spectrum as the product of Example 1. The procedure of Example 2 gave higher yields, e.g., 47 to 74.0% over several different runs, than that of Example 1. However, the products of Example 2, on the average, were not as pure as those of Example 1.

EXAMPLE 3

Into a suspension of 1 part of ferric chloride in 30 parts of cis 1,2-dichloroethylene there were added dropwise with stirring 12 parts (0.06 mole) of 1,2,2-trichloroethyl sulfenyl chloride at 60° C. (moderate reflux) over a period of 15 minutes. Standing overnight, removing ferric chloride by using acetone and water, drying of the remaining solution and removing the organic solvent in vacuum gave 16.3 parts of crude product which, in turn, furnished 7.6 parts (42.5% yield) of pure bis(1,2,2-trichloroethyl) sulfide as a yellow oil, B.P.$_{-1.0}$ 125° C., $n_D^{20}$ 1.5710 when subjected to fractionation in high vacuum.

EXAMPLE 4

3.1 grams (0.01 mole) of bis(1,2,2-trichloroethyl) sulfoxide (prepared in Example 6) were taken up in a mixture of 20 ml. of glacial acetic acid and 20 ml. of acetic anhydride and reduced by dropwise addition under stirring of 15 ml. of a 20% TiCl$_3$ solution in concentrated hydrochloric acid at room temperature with occasional cooling to control the exothermic temperature rise over a period of 30 minutes. The mixture was then kept for 3 hours at 90° to 95° C. and allowed to stand overnight at room temperature. All operations were carried out in a nitrogen atmosphere. Filtering off the formed precipitate of titanium dioxide and oxychlorides, diluting the filtrate with 2 volumes of water, taking up the heavy oil into chloroform, repeated washing free of acid with water, drying and stripping of the solvent gave 2.8 grams (94% yield) of crude bis(1,2,2-trichloroethyl) sulfide, most of which distilled at 90° to 95° C. at 0.05 mm. Hg and having the same basic infrared spectrum as the product of Example 1.

EXAMPLE 5

Into 100 parts of a crude mixture of bis(1,2,2-trichloroethyl) sulfide and bis(1,2,2-trichloroethyl) disulfide made as in Example 1 there were introduced under stirring and occasional cooling by means of an external ice-water bath at 30° C. over a period of 1 hour 15 parts of dry chlorine gas, sufficient to convert the 70% disulfide in the crude mixture to easily distillable 1,2,2-trichloroethyl sulfenyl chloride. The resulting mixture was then subjected to flash evaporation at 0.1 mm. Hg. The sulfenyl chloride which came over at 30° to 40° C. was recovered by trapping and the residue distilled in a high vacuum to give 17 parts of bis(1,2,2-trichloroethyl) sulfide as a yellow oil in a yield of 57%. In other runs yields up to 63% were obtained.

EXAMPLE 6

62 grams (0.209 mole) of redistilled bis(1,2,2-trichloroethyl) sulfide were oxidized by diluting with 100 ml. of glacial acetic acid and gradually mixing with 23.7 grams of 30% aqueous hydrogen peroxide (a slight excess) followed by standing at room temperature (25° C.) over a period of 42 hours, followed by heating at 60° to 70° C. for a further 2 hours. Diluting with 2 volumes of water, taking up the precipitated oil into chloroform, removing free acetic acid by repeated washing with water, drying and stripping of the solvent furnished a yield of 55 grams (84% yield) of a heavy oil which, on diluting with petroleum ether (Skelly B) and repeated cooling, gave 21 grams (32% yield) of crude solid product which was recrystallized to give 17 grams (26% yield) of pure white crystals of bis(1,2,2-trichloroethyl) sulfoxide, M.P. 88° C., B.P.$_{0.01}$ 102° to 105° C., Cl 67.0% (68.0% theory); S 10.0% (theory 10.2%). The pure solid product is identified hereinafter as Compound 4922.

In a repeat of this experiment using a 4 day standing period at room temperature for the oxidation the yield of pure product was increased to 34%. Low temperatures were also found to diminish the formation of unsaturated materials as impurities.

EXAMPLE 7

60 grams (0.202 mole) of pure bis(1,2,2-trichloroethyl) sulfide were diluted with 150 ml. of glacial acetic acid, 20.2 grams of 30% aqueous hydrogen peroxide were added and the mixture allowed to stand for 4 days at room temperature (25° to 27° C.). The mixture was poured into 2 volumes of ice-water, the bottom oil taken up with chloroform and this solution treated as described in Example 6 to give 63.5 grams (quantitative yield) of crude oil, from which after removal of the solid bis(1,2,2-trichloroethyl) sulfoxide by chilling from the petroleum ether (Skelly B) and vacuum stripping gave 34.2 grams (54% yield) of bis(1,2,2-trichloroethyl) sulfoxide-oil form (i.e., the oil-modification). This was subjected to high vacuum distillation and boiled 117° to 125° C. at 0.02 to 0.03 mm. Hg and had an $n_D^{20}$ 1.5602 to 1.5720. About 10 grams of the last fraction obtained in this range had an $n_D^{20}$ 1.5720 and was a thick, almost colorless syrup. The oil product was thus divided into two fractions. The lower boiling fraction in the 117° to 125° C. range analyzed Cl 66.3%, S 10.6% and the higher boiling fraction in the 117° to 125° C. range analyzed Cl 66.8%, S 11.6%. (Theory for bis(1,2,2-trichloroethyl) sulfoxide is Cl 68.0%, S 10.2%.) The infrared spectrum for the high boiling oil fraction in Example 7 was very similar to that of the solid product of Example 6 both showing peaks at 3.4 microns, 7.8 microns, 9.3 microns, 9.8 microns, 12.6 microns and 13.7 microns. The spectrum for the solid product of Example 6 showed a trace of unsaturated impurity at 10.9 microns while the spectrum of the oil of Example 7 showed considerably more unsaturated impurity at 10.9 micron and also showed unsaturated impurities at 6.4 microns. The high boiling fraction in Example 7 was redistilled and had a B.P.$_{.03}$ 115° to 117° C. This oil-modification of bis(1,2,2-trichloroethyl) sulfoxide is identified hereinafter as Compound 5008.

Crystallization of the oil-modification of bis(1,2,2-trichloroethyl) sulfoxide prepared in Example 7 could not be achieved in this experiment or in a repeat experiment in which 51% yield of the oil-modification was obtained.

EXAMPLE 8

10 grams of ferric chloride (anhydrous) were suspended in 400 grams (100% excess) of vinylidene chloride and 102 grams (1.0 mole) of sulfur dichloride were added dropwise under stirring and occasional cooling to maintain a gentle reflux (35° C.) over a period of 1 hour. Standing overnight, heating to reflux for 3 hours, removing ferric chloride by treatment with acetone, drying and stripping off excess vinylidene chloride gave 232 grams of crude bis(2,2,2-trichloroethyl) sulfide-bis(2,2,2-trichloroethyl) disulfide mixture which was subjected to fractionation. A 30% yield was obtained of a colorless fraction which had a B.P.$_{0.02}$ 91° C., $n_D^{20}$ 1.5642. This was redistilled to give pure bis(2,2,2-trichloroethyl) sulfide (Compound 5006) B.P.$_{.07}$ 88° to 89° C., $n_D^{20}$ 1.5551. The product solidified on standing to white needles M.P. 45° C.

EXAMPLE 9

3.5 grams (0.0118 mole) of bis(2,2,2-trichloroethyl) sulfide were diluted with 10 ml. of glacial acetic acid and 1.2 grams of 31.0% aqueous hydrogen peroxide (0.01) mole added. The mixture was allowed to stand for 6 days at room temperature (25° to 30° C.) and diluted with water to give 3.7 grams (quantitative yield) of the crude product as a white solid. The latter was taken up in chloroform, washed several times with water, dried and stripped to give 1.8 grams (50% yield) of bis(2,2,2-trichloroethyl) sulfoxide (Compound 5025) as a white solid which on recrystallization had a M.P. of 135° to 137° C. and had a B.P.$_{0.09}$ of 143° to 144° C.

EXAMPLE 10

29.7 grams (0.1 mole) of bis(1,2,2-trichloroethyl) sulfide were diluted with 100 ml. of petroleum ether (Skelley B) and dehydrochlorinated by dropwise addition with stirring and occasional cooling of 20.3 grams (0.2 mole) of triethyl amine in Skelley B (1:1 by volume). Continued stirring at room temperature for 4 hours, removing the triethylamine hydrochloride formed and the unreacted triethylamine by washing with dilute aqueous hydrochloric acid and then with dilute aqueous sodium bicarbonate, followed by drying and stripping off the solvent gave 24 grams (quantitative yield) of crude residue which on distillation gave 20.5 grams (85% yield) of 1,2-dichlorovinyl-1,2,2-trichloroethyl sulfide (Compound 4968) as a yellow oil B.P.$_{0.02}$ 53° to 54° C., $n_D^{20}$ 1.5715 which analyed Cl 66.6% (theory 68.2%), S 11.7% (theory 12.3%).

EXAMPLE 11

10 grams (0.0336 mole) of bis(1,2,2-trichloroethyl) sulfide were dissolved in 50 ml. of anhydrous benzene and a solution of 1.55 grams of sodium metal (2 gram equivalents) in 100 ml. of anhydrous ethyl alcohol was added dropwise with stirring at 20° to 25° C. with occasional cooling. The dehydrochlorination proceeded rapidly and the sodium chloride formed in quantitative amount was filtered off after the reaction mixture was stirred for 1 hour at room temperature (25° to 30° C.). Removal of all the solvents gave 7.3 grams (97% yield) of crude bis-(1,2-dichlorovinyl) sulfied as a yellow oil which, after distillation, gave 5.5 grams (73% yield) of pure bis(1,2-dichlorovinyl) sulfide (Compound 5021) as a yellow oil B.P.$_{0.03}$ 40° to 43° C., $n_D^{28}$ 1.5803.

EXAMPLE 12

5 grams (0.0208 mole) of recrystallized bis(1,2-dichlorovinyl) sulfoxide prepared according to Example 13 were dissolved in a mixture of 20 ml. of glacial acetic acid and 25 ml. of acetic anhydride and reduced by dropwise addition with stirring of 30 ml. of a 20% solution of TiCl$_3$ in concentrated hydrochloric acid. The mixture was kept for 4 hours at 95° to 100° C. All of the operations were carried out in a nitrogen atmosphere. The titanium oxide and oxychlorides formed were filtered off, the filtrate was diluted with 2 volumes of water, and the oil taken up in chloroform, repeatedly washed with water until free of acid, dried and stripped of solvent to give 2.5 grams (54% yield) of bis(1,2-dichlorovinyl) sulfide as a yellow oil B.P.$_{0.04}$ 40° to 41° C., $n_D^{20}$ 1.5826.

EXAMPLE 13

12 grams (0.0383 mole) of pure bis(1,2,2-trichloroethyl) sulfoxide were dissolved in 100 ml. of dry benzene and dehydrochlorinated by dropwise addition with stirring and cooling at between 4° and 10° C. of a solution of 7.75 grams (0.0766 mole) of triethylamine in 50 ml. of dry benzene over a period of 1 hour. The mixture was allowed to warm to room temperature with continued agitation over a period of 1 further hour, the triethylamine hydrochloride formed was removed, the product washed first with dilute hydrochloric acid and then with water until neutral, dried and the benzene removed in vacuum to give 8.1 grams (88.2% yield) of crude product which was distilled to give 7 grams (76% yield) of bis(1,2-dichlorovinyl) sulfoxide (Compound 4965) as a colorless oil B.P.$_{0.017}$ 69° to 70° C., $n_D^{20}$ 1.5865. The oil solidified on standing. It was recrystallized from Skelley B to give 5.3 grams (57.5% yield) of pure Compound 4965, M.P. 58° C. Analysis gave for Cl 57.5% (theory 59.2%) and for S 13.2% (theory 13.4%).

EXAMPLE 14

1.5 grams (0.0067 mole) of bis(1,2-dichlorovinyl) sulfide were diluted with 15 ml. of glacial acetic acid and mixed with 0.76 gram fo 30% aqueous hydrogen peroxide. The reaction mixture was allowed to stand at room temperature (25° to 27° C.) for two days, poured into water and small amounts of acetic acid and water were removed from the bottom oil obtained to give 1.6 grams (quantitative yield) of a colorless oil which solidified on standing. The product was bis(1,2-dichlorovinyl) sulfoxide. It had the same infrared spectrum as the product of Example 13.

EXAMPLE 15

13.0 grams (0.05 mole) of 1,2-dichlorovinyl-1,2,2-trichloroethyl sulfide were diluted with 30 ml. of glacial acetic acid and slowly mixed with 5.9 ml. of a 30% aqueous hydrogen peroxide solution and allowed to stand at room temperature for 48 hours. The oxidation was completed by heating for 45 minutes at 85° C. The mixture was poured into two volumes of water, the bottom oil taken up in chloroform, washed free of acetic acid with water, dried and stripped to give 12.7 grams (92% yield) of crude product which was distilled to give 9.5 grams of pure 1,2 - dichlorovinyl - 1,2,2-trichloroethyl sulfoxide (Compound 5009) B.P.$_{0.03}$ 87° to 89° C., $n_D^{20}$ 1.5765. Elemental analysis gave for Cl 62.9% (theory 64.1%) and for S 10.9% (theory 1.6%).

EXAMPLE 16

10 grams (0.032 mole) of pure bis(2,2,2-trichororethyl)sulfoxide made according to Example 9 were dissolved in a mixture of 25 ml. of acetic acid and 35 ml. of acetic anhydride. Then, 40 ml. of a 20% TiCl$_3$ solution in concentrated hydrochloric acid were added with care under stirring and cooling. Finally, the temperature was allowed to go up to 100° to 105° C. and kept there for 6 hours. The process was carried out in a nitrogen atmosphere. The product was then purified in the manner described in Example 4 and distilled to give 5 grams (53%) of bis(2,2,2-trichloroethyl) sulfide B.P.$_{0.07}$ 88° to 89° C., $n_D^{20}$ 1.5551.

EXAMPLE 17

To 60 grams of bis(2,2,2-trichloroethyl) sulfide-bis-(2,2,2-trichloroethyl) disulfide mixture (0.2 molar as the sulfide) diluted with 100 ml. of glacial acetic acid there were added 52.3 grams of a 26% aqueous hydrogen peroxide solution (0.4 mole) at 90° to 105° C. over a period of 1 hour with stirring. The mixture was heated further for 1 hour at 93° C. and then allowed to stand overnight at room temperature to complete the oxidation. The mixture was diluted with 2 volumes of water, filtered, washed free of acids, taken up in chloroform, dried and stripped to give 15 (24% yield) of crude solid which was recrystallized from Skelly B to give 13 grams (21% yield) of pure bis(2,2,2-trichloroethyl) sulfoxide, M.P. 136° to 137° C. (Compound 5025). Elemental analysis gave for Cl 66.6% (theory 68.0%) and for S 9.9% (theory 10.2%).

EXAMPLE 18

To 6.0 grams (0.025) mole) of bis-(2,2-dichlorovinyl) sulfoxide (Compound 5026) diluted with a mixture of 15 ml. of glacial acetic acid and 35 ml. of acetic anhydride there were added dropwise with stirring 30 grams (0.05 mole) of a 20% $TiCl_3$ solution in concentrated hydrochloric acid while cooling under a blanket of nitrogen gas. The temperature was allowed to rise slowly to 100° to 105° C. by the end of the addition period. The mixture was kept at this temperature for 3 hours and then worked up and the crude product isolated in the manner described in Example 4. The product was distilled in a high vacuum to give 4.0 grams (77% yield) of pure bis(2,2-dichlorovinyl) sulfide (Compound 5027), B.P.$_{0.05}$ 59° to 60° C., $n_D^{20}$ 1.5955. Elemental analysis gave for Cl 61.7% (theory 63.3%) and for S 14.3% (theory 14.1%).

EXAMPLE 19

10 grams (0.0336 mole) of bis(2,2,2-trichloroethyl) sulfide were dissolved in 50 ml. of anhydrous benzene and dehydrochlorinated by dropwise addition with stirring and occasional cooling of 100 ml. of anhydrous ethyl alcohol containing 1.55 grams (2 gram equivalents) of sodium metal at 20° to 25° C. The mixture was allowed to stand at room temperature for 5 to 6 hours, the sodium chloride formed filtered off, the product washed with water, extracted with chloroform, dried and the solvents removed by distillation to give 3.0 grams (40% yield) of pure bis(2,2-dichlorovinyl) sulfide, B.P.$_{0.02}$ 47° C., $n_D^{27}$ 1.5872.

EXAMPLE 20

6.5 grams (0.0219 mole) of bis(2,2,2-trichloroethyl) sulfide (Compound 5006) were diluted with 25 ml. of benzene and dehydrochlorinated by dropwise addition of 4.43 grams (0.0428 mole) of triethylamine. Standing overnight at room temperature (25° to 30° C.) followed by refluxing for 2 hours, removing the triethylamine hydrochloride and unreacted triethylamine by filtration and washing with dilute aqueous hydrochloric acid and water gave 3.5 grams of a yellow oil, most of which distilled at B.P.$_{0.02}$ 51° to 52° C. and which was a mixture of a large proportion of 2,2-dichlorovinyl-2,2,2-trichloroethyl sulfide (Compound 5103) with some bis-(2,2-dichlorovinyl)sulfide and some starting Compound 5006.

EXAMPLE 21

The amount of triethylamine was reduced to only 1 mole equivalent in this example wherein 10 grams (0.0337 mole) of bis(2,2,2-trichloroethyl) sulfide (Compound 5006) were diluted with 50 ml. of Skelly B and 3.4 grams (0.0337 mole) of triethylamine were added dropwise with stirring at 10° to 15° C. The temperature was allowed to rise to room temperature, followed by refluxing at 55° C. for 3 hours to complete the reaction. Washing the resulting Skelly B solution with dilute aqueous hydrochloric acid, sodium bicarbonate and water, followed by drying and stripping and distillation in high vacuum gave 5.4 grams of a pale orange oil, B.P.$_{0.01}$ 70° to 73° C., $n_D^{27}$ 1.5575. Infrared analysis and gas chromatography showed that the product was a mixture of 2,2-dichlorovinyl-2,2,2-trichloroethyl sulfide (Compound 5103), bis(2,2-dichlorovinyl) sulfide (Compound 5027) and the starting Compound 5006.

Compound 5103 was isolated in pure form by separating from a gas chromatographic column of a sample obtained by using ethyl alcohol as the solvent during dehydrochlorination.

Example 21 was repeated by replacing the Skelly B in turn by benzene, tetrahydrofurane and ethyl alcohol and a similar mixture of products obtained. The general method was to dissolve 10 grams (0.03 mole) of Compound 5006 in 50 ml. of benzene (or tetrahydrofurane, or ethyl alcohol), heating to beginning reflux and adding slowly 3.7 grams (1.1 mole equivalent) of triethylamine over 30 minutes, washing the benzene mixture with water, taking up the oil in chloroform, drying and stripping to give crude oils which were separated into their components by gas chromatography.

Thus, the results using bis(2,2,2-trichloroethyl) sulfide (Compound 5006) using triethylamine as the dehydrochlorination agent are different from those using bis-(1,2,2-trichloroethyl) sulfide (Compound 4975). Compound 4975, even with a considerable excess of triethylamine gave the hemi-unsaturated Compound 4968 exclusively, whereas Compound 5006 gave mixtures of hemi-unsaturated Compound 5103 and considerable amounts of the fully unsaturated Compound 5027.

EXAMPLE 22

13.0 grams (0.0415 mole) of bis(2,2,2-trichloroethyl) sulfoxide were dissolved in 75 ml. of dry benzene and dehydrochlorinated by dropwise addition of 8.4 grams (0.083 mole) of triethylamine with stirring and cooling at 10° to 15° C. for 30 minutes. The mixture was allowed to warm to room temperature (25° to 30° C.), the triethylamine hydrochloride formed removed by filtration, the product washed with water, dried and the benzene filtrate stripped to give 9.0 grams (90% yield) of bis(2,2-dichlorovinyl) sulfoxide (Compound 5026) after chilling of a Skelly B solution of the crude material from the benzene solution. Compound 5026 was a white crystalline solid, M.P. 35° to 36° C.

EXAMPLE 23

10 grams of anhydrous ferric chloride were dispersed in 786 grams (6.0 mole) of trichloroethylene, the mixture warmed to 70° to 75° C. and 206 grams (2.0 moles) of sulfur dichloride added at this temperature dropwise with stirring over a period of 1 hour. The mixture was heated for an additional 3 hours at 70° to 75° C. and the ferric chloride removed by filtration, followed by decanting with acetone, drying and stripping to give 526 grams of a mixture of bis(1,2,2-tetrachloroethyl) sulfide and bis(1,2,2,2-tetrachloroethyl) disulfide as a dark oil. This dark oil mixture is identified hereinafter as Compound 4501.

A 102 gram portion of this product was fractionated to give 20 grams of pure bis(1,2,2,2-tetrachloroethyl) sulfide (compound 5052), B.P.$_{0.015}$ 74° to 75° C., $n_D^{25}$ 1.5834

EXAMPLE 24

10 grams (0.0273 mole) of Compound 5052 were dissolved in 50 ml. of glacial acetic acid and 3.1 grams of 30% aqueous hydrogen peroxide added at room temperature. The oxidation mixture was allowed to stand for 2 weeks, followed by heating at 90° to 95° C. for 3 hours. The mixture was poured into 1 volume of water, the bottom oil freed of acetic acid by successive water washings, diluted with chloroform and dried over anhydrous magnesium sulfate, and the solvent stripped to give 7.1 grams (70% yield) of bis(1,2,2,2-tetrachloroethyl) sulfoxide (Compound 5054) $n_D^{25}$ 1.5830.

EXAMPLE 25

15 grams (0.0408 mole) of bis(1,2,2,2-tetrachloroethyl) sulfide were dissolved in 50 ml. of dry benzene and dehydrochlorinated by dropwise addition at 30° to 35° C. with stirring and cooling of 4.12 grams (0.0816 mole) of triethylamine in 10 ml. of benzene. Stirring of the mixture at room temperature for 3 hours followed by standing for 48 hours completed the reaction. Filtration and water washing to remove all the triethylamine hydrochloride, drying and stripping of the benzene solution gave 12.5 grams of crude residue which furnished 10.0 grams (83.5% yield) of bis(perchlorovinyl) sulfide (Compound 5053) as a yellow oil, B.P.$_{0.03}$ 71° to 73° C., $n_D^{25}$ 1.5985.

EXAMPLE 26

To 5 grams (0.0162 mole) of bis(perchlorovinyl) sulfoxide diluted with 15 ml. of acetic acid and 35 ml. of acetic anhydride there were added dropwise 20 grams (0.032 mole) of a solution of 20% $TiCl_3$ in concentrated hydrochloric acid with stirring and cooling in a nitrogen atmosphere. The temperature was allowed to gradually climb to 100° to 105° C. at the end of the addition period. The mixture was heated at 100° to 105° C. for a further 3 hours to complete the reduction. The precipitate of titanium oxide and oxychlorides was filtered off, the filtrate diluted with 2 volumes of water, taken up in chloroform, washed repeatedly with water to remove the acid, dried and stripped of solvent to obtain 3.5 grams of bis(perchlorovinyl) sulfide.

EXAMPLE 27

13 grams (0.034 mole) of Compound 5054 were dissolved in 100 ml. of dry benzene and dehydrochlorinated by dropwise addition of 6.9 grams (0.068 mole) of triethylamine diluted with 20 ml. of benzene with stirring at 30° to 35° C. over a period of 20 minutes. Further heating for 1 hour at 50° to 60° C., removing the triethylamine hydrochloride by filtration and washing with diluted aqueous hydrochloric acid, drying over anhydrous magnesium sulfate gave 10.5 grams (a quantitative yield) of crude product which was found to contain 78% of bis(perchlorovinyl) sulfoxide (Compound 5055), an oil which, on distillation in high vacuum, had a B.P.$_{0.05}$ 95° to 100° C., $n_D^{27}$ 1.6070.

EXAMPLE 28

5 grams (0.0169 mole) of bis(perchlorovinyl) sulfide were taken up in 20 ml. of glacial acetic acid and 2.0 grams of 30% aqueous hydrogen peroxide solution were added at room temperature. This mixture was allowed to stand for 14 days, poured into 2 volumes of water, the bottom oil taken up in chloroform, washed repeatedly with water to remove acetic acid, dried and stripped to given 4.6 grams (87% yield) of crude bis(perchlorovinyl) sulfoxide $n_D^{25}$ 1.6024, Cl 67.8% (theory 68.9%), S 10.6% (theory 10.4%).

EXAMPLE 29

Even when the amount of peroxide was doubled it was not possible to form the sulfone from Compound 5053 but, instead, the sulfoxide (Compound 5055) was obtained, as shown in this example.

1.5 grams (0.00512 mole) of bis(perchlorovinyl) sulfide were taken up in 15 ml. of glacial acetic acid, 1.10 grams (0.0102 mole) of 30% aqueous hydrogen peroxide added and the mixture heated on a steam bath for 3 hours. After standing for several days at room temperature, it was worked up by pouring into water, the lower oil layer taken up in chloroform, the small amount of acetic acid removed by repeated washing with water, the product dried and stripped to give 1.3 grams (82% yield) of pure bis(perchlorovinyl) sulfoxide as a colorless oil.

The compounds of the present invention can be used alone as nematocides or fungicides, but it has been found desirable to apply them to the pest, e.g., to the soil habitat of nematodes, together with inert solids to form dusts, or more preferably suspended in a suitable liquid diluent, preferably water. There can also be added surface active agents and inert solids in such liquid formulations. Desirably, 0.05 to 1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petrolum naphtha, ketones such as acetone, methyl ethyl ketone and cyclohexanone, and alcohols, e.g., ethanol, isopropanol and amyl alcohol, etc.

The nematocides and fungicides of the present invention can also be applied with inert nematocidal or fungicidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumic, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionc, cationic or nonionic in character.

Typical classes of surface active agents include alkyl sulfonate salts, alkylaryl sulfonate salts, alkyl sulfiate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and resin acids, e.g., Ethofat 7 and 13, sodium N-methyl-N-oleyltaurate, Turkey Red Oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus, the active ingredient can be mixed with the solid carrier in finely divided form in amounts small enough to preserve the free-flowing property of the final dust composition.

In commercial practice the compositions containing the nematocides of the present invention are applied to the soil infested with nematodes.

In the following examples or tables illustrating nematocidal or fungicidal activity the compounds of the invention, as well as the comparison compounds, were formulated are wettable powders consisting of 50% of the compound being tested, 46% Hi-Sil 233 (ultra fine silica), 2% Marasperse N (sodium lignin sulfonate) and 2% Pluronic (polyethylene oxide-propylene oxide adduct molecular weight about 1000). This wettable powder is hereinafter designated as Formulation A.

EXAMPLE 30

The saprophytic nematode tests ("NESA") were carried out in water as the medium with Panagrellus and Rhabditis spp. nematodes at room temperature utilizing Formulation A. The results are recorded in Table I as percent kill at the indicated dosages in parts per million after a 4 day incubation period. A 10% kill is merely the same amount of kill as occurs with a blank sample.

TABLE I

| Compound | NESA at p.p.m. | | | | |
|---|---|---|---|---|---|
| | 200 | 100 | 50 | 25 | 12.5 |
| 7594 | 100 | 100 | 80 | 50 | 30 |
| 4922 | 100 | 100 | 100 | 40 | 40 |
| 5008 | 100 | 100 | 100 | 70 | 30 |
| 4965 | 100 | 100 | 100 | 80 | 30 |
| 5021 | 100 | 100 | 80 | 40 | 10 |
| 4968 | 100 | 100 | 80 | 60 | 20 |
| 5009 | 100 | 100 | 100 | 70 | 30 |
| 5006 | 100 | 100 | 50 | 10 | 10 |
| 5025 | 100 | 40 | 10 | 10 | 10 |
| 5026 | 100 | 80 | 30 | 10 | 10 |
| 5027 | 100 | 80 | 40 | 10 | 10 |
| 5052 | 10 | 10 | 10 | 10 | 10 |
| 5054 | 30 | 10 | 10 | 10 | 10 |
| 5055 | 100 | 100 | 100 | 100 | 60 |
| 5053 | 10 | 10 | 10 | 10 | 10 |

It will be observed that the unsaturated sulfoxide Compound 5055 (perchlorovinyl sulfoxide) was an excellent nematocide whereas the corresponding sulfide (Compound 5053) was completely ineffective. Both bis(1,2,2,2-tetrachloroethyl) sulfide (Compound 5052) and the corresponding sulfoxide (Compound 5054) were also ineffective as nematocides. In contrast, bis(1,2,2-trichloroethyl) sulfide (Compound 4975) and the corresponding sulfoxide (Compounds 4922 and 5008) were excellent nematocides. Bis(1,2-dichlorovinyl) sulfide (Compound 5021) was a good nematocide and the corresponding sulfoxide (Compound 4965) was even better. This was also true of the mixed saturated-unsaturated sulfide Compound 4968 and the corresponding sulfoxide (Compound 5009).

The bis(2,2-dichlorovinyl) sulfide (Compound 5027) and sulfoxide (Compound 5026) were considerably inferior as nomatocides to the corresponding 1,2-dichlorovinyl isomers (Compounds 5021 and 4965). Surprisingly, in view of the other results bis(2,2,2-trichloroethyl) sulfide (Compound 5006) was a better nematocide than the corresponding sulfoxide (Compound 5025), although neither was among the better compounds tested.

EXAMPLE 31

Several of the compounds were also tested against parasitic nematodes employing Formulation A. The nematode employed was Meloidogyne spp. and the procedure was a 10 day contact test carried out in water-agar medium in the presence of tomato roots at room temperature. The results indicated high activities e.g. for Compounds 4975 and 4922, which were found to be 100% effective at 25 p.p.m. and 50% effective at 12.5 p.p.m. rates of application.

EXAMPLE 32

The compounds were also tested as fungicides in plate fungicide tests as indicated in Table II. The compounds were made up into Formulation A and then added to agar cultures of the fungi. In the table, 10 indicates 100%
effectiveness and 0 indicates no effectiveness. In Table II, P stands for Pythium spp., R for Rhizoctonia, F for Fusarium and H for Helminthosporium. The concentrations are expressed as parts per million (p.p.m.).

TABLE II

| Compound at p.p.m. | P | | R | | F | | H | |
|---|---|---|---|---|---|---|---|---|
| | 100 | 10 | 100 | 10 | 100 | 10 | 100 | 10 |
| 4975 | 10 | 10 | 10 | 7 | 10 | 4 | 10 | 10 |
| 4922 | 10 | 10 | 10 | 10 | 10 | 3 | 10 | 10 |
| 5008 | 10 | 10 | 10 | 10 | 10 | 3 | 10 | 10 |
| 4965 | 10 | 10 | 10 | 10 | 10 | 2 | 10 | 10 |
| 5021 | 0 | ---- | 0 | ---- | 0 | ---- | 0 | ---- |
| 4968 | 5 | 2 | 8 | 0 | 4 | 0 | 4 | 4 |
| 5009 | 10 | 10 | 10 | 10 | 10 | 5 | 10 | 10 |
| 5006 | 0 | ---- | 0 | ---- | 0 | ---- | 0 | ---- |
| 5025 | 0 | ---- | 0 | ---- | 0 | ---- | 0 | ---- |
| 5026 | 5 | ---- | 0 | ---- | 0 | ---- | 0 | ---- |
| 5027 | 5 | ---- | 0 | ---- | 0 | ---- | 3 | ---- |
| 5052 | 3 | ---- | 0 | ---- | 0 | ---- | 0 | ---- |
| 5054 | 0 | ---- | 0 | ---- | 0 | ---- | 0 | ---- |
| 5055 | 0 | ---- | 0 | ---- | 0 | ---- | 3 | ---- |
| 5053 | 0 | ---- | 0 | ---- | 0 | ---- | 0 | ---- |

Compounds 4922, 5008, 4965 and 5009 were very effective as soil fungicides at the rate of (lbs./acre) of 200, 100, 50, 25 and 12.5. Compounds 5054 and 5055 were effective soil fungicides at 200 and 50 lbs./acre. Compound 4922 was the best of all the compounds as a soil fungicide.

Bis(1,2,2-trichloroethyl) sulfoxide and its use as a fungicide and nematocide are claimed in our copending application Ser. No. 338,297, filed Jan. 17, 1964, now Patent 3,249,495.

What is claimed is:
1. A compound having the formula

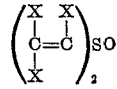

where at least two of the X groups are halogen of atomic weight between 35 to 80 and the remaining X is selected from the group consisting of halogen of atomic weight between 35 and 80 and hydrogen.
2. Bis(1,2-dichlorovinyl) sulfoxide.
3. Bis(1,2,2-trichlorovinyl) sulfoxide.

References Cited

UNITED STATES PATENTS 3,101,377   8/1963   Bluestone et al. _____ 260—607

OTHER REFERENCES

Ketrov et el.: "Chem. Abstracts," vol. 27, p. 952 (1933).

CHARLES B. PARKER, Primary Examiner.

D. R. PHILLIPS, Assistant Examiner.

U.S. Cl. X.R.
260—609; 424—335